United States Patent
Yao et al.

(10) Patent No.: US 9,692,328 B2
(45) Date of Patent: Jun. 27, 2017

(54) MOTOR DRIVING CIRCUIT TO REDUCE SWITCHING LOSS

(71) Applicant: ASIA VITAL COMPONENTS (CHINA) CO., LTD., Shenzhen (CN)

(72) Inventors: Bao-Lin Yao, Shenzhen (CN); Qing-Wu Hu, Shenzhen (CN)

(73) Assignee: Asia Vital Components (China) Co., Ltd., Shenzhen (CN)

( * ) Notice: Subject to any disclaimer, the term of this patent is extended or adjusted under 35 U.S.C. 154(b) by 160 days.

(21) Appl. No.: 14/636,192

(22) Filed: Mar. 3, 2015

(65) Prior Publication Data

US 2016/0261212 A1 Sep. 8, 2016

(51) Int. Cl.
*H02P 25/028* (2016.01)
*H02P 25/034* (2016.01)
*H02P 6/15* (2016.01)
*H02P 6/26* (2016.01)
*H02M 7/5387* (2007.01)

(52) U.S. Cl.
CPC ............ *H02P 6/15* (2016.02); *H02P 6/26* (2016.02); *H02M 7/5387* (2013.01)

(58) Field of Classification Search
CPC .............................. H01L 27/085; H01L 24/06
See application file for complete search history.

(56) References Cited

U.S. PATENT DOCUMENTS

| 4,859,921 | A | 8/1989 | Archer | |
|---|---|---|---|---|
| 5,408,150 | A | 4/1995 | Wilcox | |
| 5,808,884 | A * | 9/1998 | Teggatz | H02M 3/1588 323/222 |
| 7,759,889 | B2 | 7/2010 | Hirata | |
| 2006/0186850 | A1* | 8/2006 | Kurita | H02P 29/0241 318/599 |
| 2009/0038944 | A1* | 2/2009 | Kruger | C02F 1/4602 204/555 |
| 2014/0285130 | A1* | 9/2014 | Inoue | H02P 6/085 318/400.29 |

FOREIGN PATENT DOCUMENTS

TW 200822519 A 5/2008

* cited by examiner

*Primary Examiner* — Eduardo Colon Santana
*Assistant Examiner* — Charles S Laughlin
(74) *Attorney, Agent, or Firm* — C. G. Mersereau; Nikolai & Mersereau, P.A.

(57) ABSTRACT

The present invention provides a motor driving circuit to reduce switching loss, which is applied to a motor. The motor driving circuit comprises a motor driving unit, a push-pull output unit, and a control unit. The control unit is coupled to the motor driving unit and the push-pull output unit. The control unit transmits a driving voltage to drive the push-pull output unit such that the push-pull output unit generates amplified currents which are transmitted to the motor driving unit. The motor driving unit reduces charge/discharge periods thereof based on the received amplified currents.

8 Claims, 3 Drawing Sheets

MOTOR DRIVING CIRCUIT TO REDUCE SWITCHING LOSS

BACKGROUND OF THE INVENTION

Field of the Invention

The present invention relates to a motor driving circuit and, in particular, to a motor driving circuit which has the effects of reducing charge/discharge periods of the first and third switches of the motor driving unit and reducing switching loss.

Description of Prior Art

With the rapid progress of technology and computer industry, the lightweight electronic product such as a notebook computer has gradually become a mainstream in the market. For such a lightweight electronic product, the heat-dissipation quality often influence the system stability, the product performance, and even the product lifetime. In order to quickly dissipate the heat generated by a computer system, the computer system is often equipped with a fan as a heat-dissipation device such that it can operate normally at proper temperature.

In general, the heat-dissipation fan used in a computer system is driven by the brushless DC motor. Please refer to FIG. 1 in which the currently traditional DC motor driving circuit 1 uses a control chip 10 to transmit a pulse width modulation (PWM) signal to a motor driving unit 12 to drive a motor. However, the PMOS transistor at the upper leg of the motor driving unit 12 has small transconductance, large logic swing amplitude, and long charge/discharge periods, resulting in serious loss of the switch (i.e., the PMOS transistor) and then poor performance of the heat-dissipation fan. The above-mentioned long charge/discharge periods of the PMOS transistor means there is capacitance (or parasitic capacitance) existing between the gate and the source of the PMOS transistor. The charge/discharge periode associated with the capacitance depends on the driving current. If the driving current is not enough (i.e., a small driving current), the charge/discharge periods associated with the capacitance value will increase, which slows down the switching speed of the PMOS transistor and thus increases the switching loss thereof.

When the PMOS transistor performs the switching at high frequency, the resultant serious switching loss will result in high temperature Tc on the surface of the PMOS transistor and easily cause a problem of insufficient derating of junction temperature Tj.

Therefore, how to overcome the above problems and disadvantages of the prior art is the focus which the inventor and the related manufacturers in this industry have been devoting themselves to.

SUMMARY OF THE INVENTION

Thus, to effectively overcome the above problems, one objective of the present invention is to provide a motor driving circuit to reduce switching loss, which reduces (or shortens) the charge/discharge period of the first and third switches of the motor driving unit to has the effect of reducing switching loss.

Another objective of the present invention is to provide a motor driving circuit to reduce switching loss, which improves the fan efficiency and solves the problem of insufficient derating of junction temperature (Tj).

To achieve the above objectives, the present invention provides a motor driving circuit to reduce switching loss, which is applied to a motor and comprises a motor driving unit, a push-pull output unit, and a control unit. The motor driving unit has a first switch, a second switch, a third switch, and a fourth switch. Each of the first, second, third, and fourth switches has a first terminal, a second terminal, a third terminal, and a fourth terminal. The second terminals of the first and third switches are individually coupled to the corresponding third terminals of the second and fourth switches. The third terminal of the first switch is coupled to the third terminal of the third switch. The second terminal of the second switch is coupled to the second terminal of the fourth switch. The fourth terminals of the second and fourth switches are coupled to a ground terminal The first terminal of the third switch is coupled to an input voltage. The push-pull output unit has a first push-pull amplifier and a second push-pull amplifier. Each of the first and second push-pull amplifiers has a first end, a second end, a third end, and a fourth end. The second and third ends of the first push-pull amplifier are connected to the fourth and first terminals of the first switch, respectively. The second and third ends of the second push-pull amplifier are connected to the fourth and first terminals of the third switch, respectively. The control unit has a plurality of pins in which a first pin is coupled to the first ends of the first and second push-pull amplifiers and transmits a driving voltage to the first and second push-pull amplifiers such that the first and second push-pull amplifiers are driven to generate a first amplified current and a second amplified current, respectively. The first and third switches receive the first and second amplifier currents, respectively, to reduce the charge/discharge periods thereof. In this way, the switching losses of the first and third switches are reduced, which further facilitates the improvement of the fan efficiency and the resolution of the problem of insufficient derating of junction temperature (Tj).

DETAILED DESCRIPTION OF THE INVENTION

Figure 1:
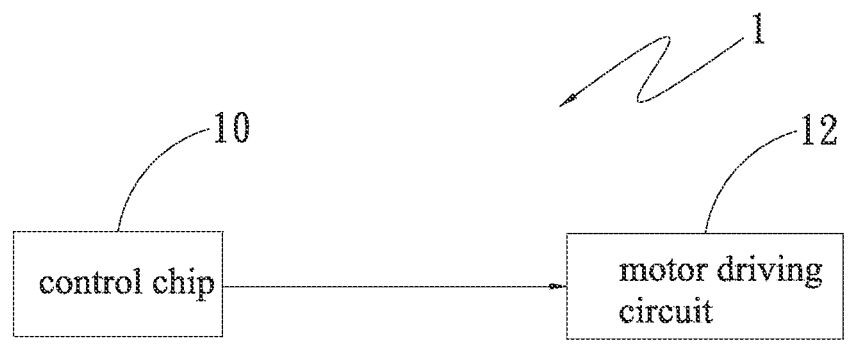
FIG. 1 shows a block diagram of a traditional DC motor driving circuit.

The above objectives of the present invention and the features of structure and function of the present invention are described according to the preferred embodiments in figures.

The present invention provides a motor driving circuit to reduce switching loss. Please refer to FIGS. 2 and 3, which are block diagrams of a preferred embodiment of the present invention. The motor driving circuit 2 is applied to a motor. In the current embodiment, the motor driving circuit 2 is applied to a brushless DC motor for explanation, but not limited to this. The motor driving circuit 2 comprises a motor driving unit 20, a push-pull output unit 26, and a control unit 28. The push-pull output unit 26 is electrically connected to the motor driving unit 20 and the control unit 28. The motor driving unit 20 has a first switch 21, a second switch 22, a third switch 23, and a fourth switch 24. Each of the first, second, third, and fourth switches 21/22/23/24 has a first terminal 211/221/231/241, a second terminal 212/222/232/242, a third terminal 213/223/233/243, and a fourth terminal 214/224/234/244.

The second terminals 212/232 of the first and third switches 21/23 are individually coupled to the corresponding third terminals 223/243 of the second and fourth switches 22/24. The third terminal 213 of the first switch 21 is coupled to (or is electrically connected to) the third terminal 233 of the third switch 23. The second terminal 222 of the second switch 22 is coupled to the second terminal 242 of the fourth switch 24. The fourth terminals 224/244 of the second and fourth switches 22/24 are coupled to a ground terminal GND. The first terminal 231 of the third switch 23 is coupled to an input voltage Vin. The first and third terminals 211/213 of the first switch 21 are internally and electrically connected to each other. The first and third terminals 231/233 of the third switch 23 are internally and electrically connected to each other.

The push-pull output unit 26 has a first push-pull amplifier 261 and a second push-pull amplifier 262. Each of the first and second push-pull amplifiers 261/262 has a first end 2611/2621, a second end 2612/2622, a third end 2613/2623, and a fourth end 2614/2624, The second and third ends 2612/2613 of the first push-pull amplifier 261 are connected to the fourth and first terminals 214/211 of the first switch 21, respectively. The second and third ends 2622/2623 of the second push-pull amplifier 262 are connected to the fourth and first terminals 234/231 of the third switch 23, respectively. The fourth ends 2614/2624 of the first and second push-pull amplifiers 261/262 are connected to the ground terminal GND.

The control unit 28 has a plurality of pins in which a first pin 281 of the control unit 28 is coupled to the first ends 2611/2621 of the first and second push-pull amplifiers 261/262 and transmits a driving voltage to the first and second push-pull amplifiers 261/262 such that the first and second push-pull amplifiers 261/262 are driven to generate a first amplified current and a second amplified current, respectively. The first switch 21 receives the first amplified current to reduce the charge/discharge periods thereof or the third switch 23 receives the second amplified current to reduce the charge/discharge periods thereof. A second pin 282 of the control unit 28 is electrically connected to (or is coupled to) the first terminal 241 of the fourth switch 24; the second pin 282 transmits a first signal to the first terminal 241 of the fourth switch 24. A third pin 283 of the control unit 28 is electrically connected to the first terminal 221 of the second switch 22; the third pin 283 transmits a second signal to the first terminal 221 of the second switch 22. The above-mentioned first and second signals are PWM signals.

Therefore, by means of the first and second push-pull amplifiers 261/262 of the present invention, the first and second amplified currents are transmitted to the first and third switches 21/23, respectively such that the first and third switches 21/23 receive the first and second amplified currents, respectively, to reduce the charge/discharge periods thereof. Because the charge/discharge periods of the first and third switches 21/23 are reduced, the switching speeds of the first and third switches 21/23 are relatively increased (or speeded up) to effectively reduce (or lower) the switching loss, which further facilitates the improvement of the fan efficiency and the resolution of the problem of insufficient derating of junction temperature (Tj).

Figure 2:
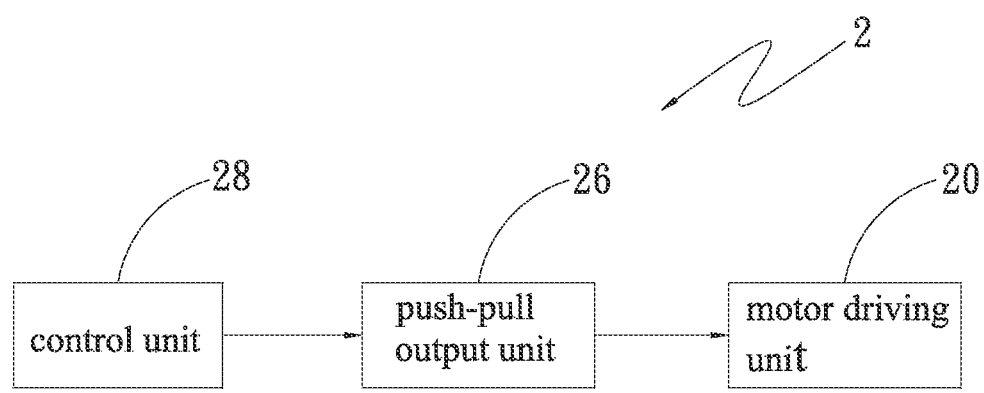
FIG. 2 shows a block diagram of a preferred embodiment of the present invention.
Figure 3:
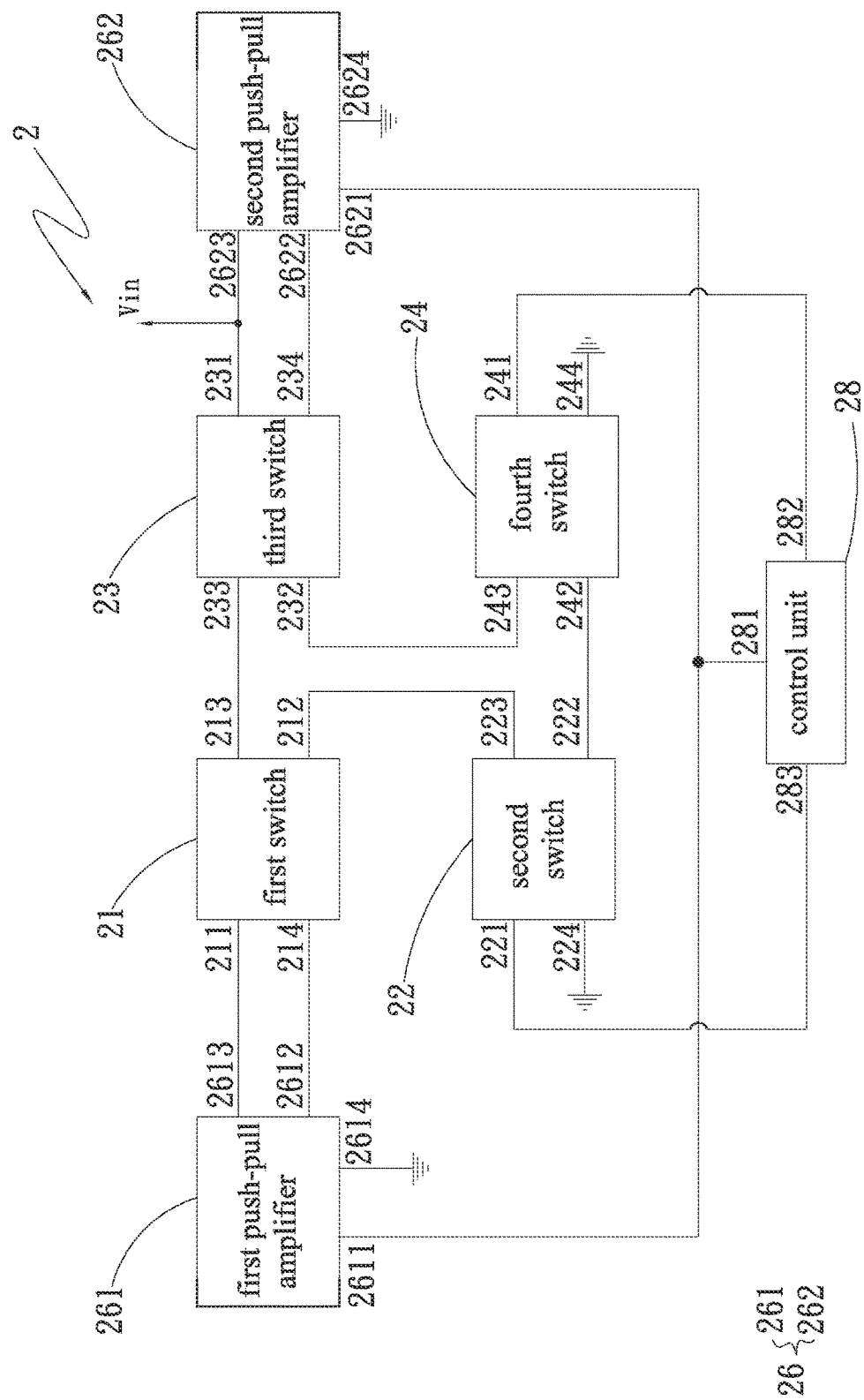
FIG. 3 shows another block diagram of a preferred embodiment of the present invention.
Figure 4:
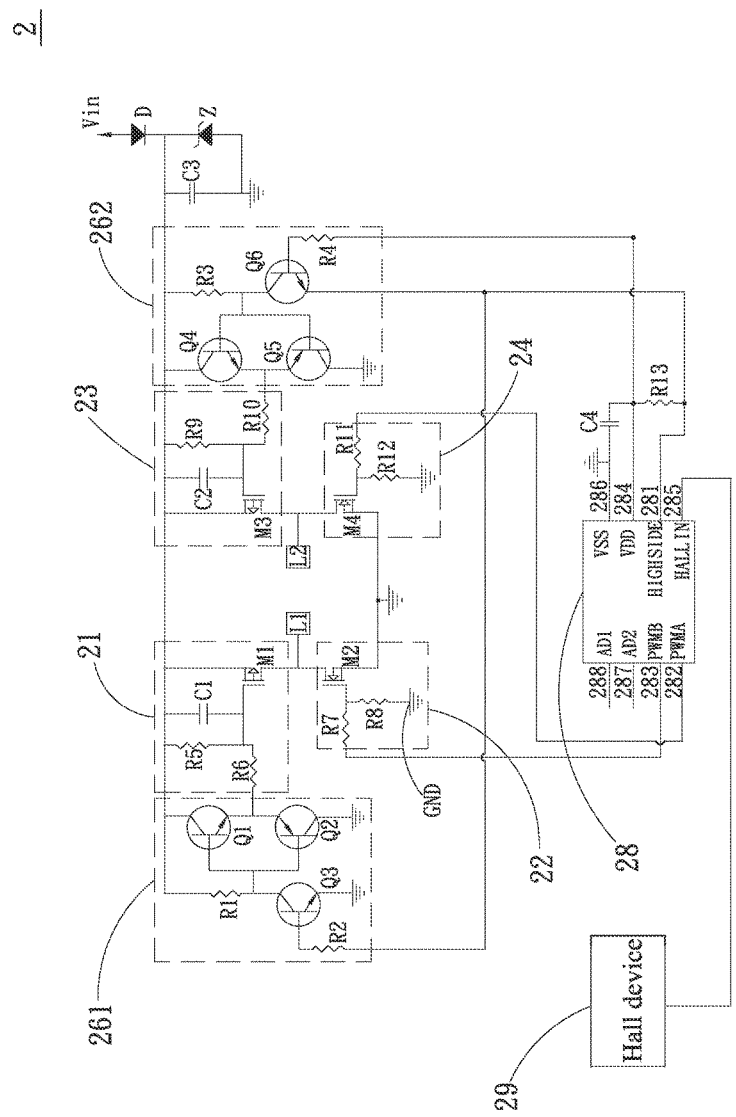
FIG. 4 shows a circuit schematic diagram of a preferred embodiment of the present invention.

Please continue to refer to FIG. 4, as well as FIGS. 2 and 3, for detailed explanation of each structure. The first push-pull amplifier 261 has a first transistor Q1, a second transistor Q2, a third transistor Q3, a first resistor R1, and a second resistor R2. The first, second, and third transistors Q1/Q2/Q3 are BJTs (Bipolar Junction Transistors) for explanation in the preferred embodiment, but not limited to this. Each of the first, second, and third transistors Q1/Q2/Q3 has a base, an emitter, and a collector. The collector of the first transistor Q1 is coupled to the first terminal 211 of the first switch 21, one end of the first resistor R1, and the input voltage Vin. The emitter of the first transistor Q1 is coupled to the emitter of the second transistor Q2 and the fourth terminal 214 of the first switch 21. The collector of the second transistor Q2 and the emitter of the third transistor Q3 are electrically connected to the ground terminal GND. The base of the second transistor Q2 is coupled to (or electrically connected to) the base of the first transistor Q1, the other end of the first resistor R1, and the collector of the third transistor Q3. The base of the third transistor Q3 is coupled to one end of the second resistor R2. The other end of the second resistor R2 is coupled to the first pin 281 of the control unit 28 to receive the driving voltage outputted by the first pin 281 such that the first push-pull amplifier 261 receives the driving voltage and is driven to be conducted. In other words, after the third transistor Q3 of the first push-pull amplifier 261 receives the driving voltage and is driven to be conducted, the current of the second transistor Q2 of the first push-pull amplifier 261 will increase.

The second push-pull amplifier 262 has a fourth transistor Q4, a fifth transistor Q5, a sixth transistor Q6, a third resistor R3, and a fourth resistor R4. The fourth, fifth, and sixth transistors Q4/Q5/Q6 are BJTs (Bipolar Junction Transistors) for explanation in the preferred embodiment, but not limited to this. Each of the fourth, fifth, and sixth transistors Q4/Q5/Q6 has a base, an emitter, and a collector. The collector of the fourth transistor Q4 is coupled to the first terminal 231 of the third switch 23 and one end of the third resistor R3. The emitter of the fourth transistor Q4 is coupled to the emitter of the fifth transistor Q5 and the fourth terminal 234 of the third switch 23. One end of the third resistor R3, one end of the third capacitor C3, the cathode of a diode D, and the cathode of a Zener diode Z are electrically connected to one another. The anode of the diode D is coupled to the input voltage Vin. The anode of the Zener diode Z and the other end of the third capacitor C3 are electrically connected to the ground terminal GND.

The collector of the fifth transistor Q5 is connected to the ground terminal GND. The base of the fifth transistor Q5 is electrically connected to (or is coupled to) the base of the fourth transistor Q4, the other end of the third resistor R3, and the collector of the sixth transistor Q6. The emitter of the sixth transistor Q6 is electrically connected to the first pin 281 of the control unit 28 to receive the driving voltage outputted by the first pin 281 such that the second push-pull amplifier 262 receives the driving voltage and is driven to be conducted. In other words, after the sixth transistor Q6 of the second push-pull amplifier 262 receives the driving voltage and is driven to be conducted, the current of the fifth transistor Q5 of the second push-pull amplifier 262 will increase. The base of the sixth transistor Q6 is coupled to one end of the fourth resistor R4.

The first switch 21 comprises a first MOS transistor M1, a first capacitor C1, a fifth resistor R5, and a sixth resistor R6. A PMOS transistor is used as the first MOS transistor M1 for explanation in the preferred embodiment, but not limited to this. The first MOS transistor M1 has a gate, a source, and a drain. The source of the first MOS transistor M1 is electrically connected to one end L1 of the motor. Two ends of the first capacitor C1 are individually and electrically connected to the drain and the gate of the first MOS transistor M1. One end of the fifth resistor R5 is electrically connected to one end of the first capacitor C1, the input voltage Vin, and the collector of the first transistor Q1. The other end of the fifth resistor R5 is coupled to the other end of the first capacitor C1 and one end of the sixth resistor R6. The other end of the sixth resistor R6 is coupled to the emitter of the first transistor Q1. In other words, the other end of the sixth resistor R6 is electrically connected to the emitters of the first and second transistors Q1/Q2.

There is capacitance (or parasitic capacitance) existing between the gate and the source of the first MOS transistor M1. The periods of the charging (i.e., turning on the first MOS transistor M1) and discharging (i.e., turning off the first MOS transistor M1) caused by the capacitance will affect the switching speed of the first MOS transistor M1. Therefore, by means of the first push-pull amplifier 261 which provides an amplified current to charge the capacitor, the charge/discharge periods can be effectively reduced, which speeds up the switching speed of the first MOS transistor M1, achieves the effect of reducing the switching loss, and facilitates the resolution of the problem of insufficient derating of junction temperature (Tj).

Besides, when the current (I) increases, the time period (T) decreases, according to the equation $Q=I \times T=C \times V$, where Q is the charge, C is the capacitance, V is the voltage, I is the current, and T is the time period. After the capacitor between the gate and the source of the first MOS transistor M1 receives the first amplified current transmitted by the first push-pull amplifier 261, the charge period of the above-mentioned capacitor by the first amplified current is effectively reduced (or shortened), the switching speed of the first MOS transistor M1 is effectively increased, and the switching loss of the first MOS transistor M1 is reduced.

Please refer to FIGS. 3 and 4. The second switch 22 comprises a second MOS transistor M2, a seventh resistor R7, and an eighth resistor R8. An NMOS transistor is used as the second MOS transistor M2 for explanation in the preferred embodiment, but not limited to this. The second MOS transistor M2 has a gate, a source, and a drain. The drain of the second MOS transistor M2 is coupled to the one end L1 of the motor and the source of the first MOS transistor M1. The gate of the second MOS transistor M2 is coupled to one end of the seventh resistor R7 and one end of the eighth resistor R8. The source of the second MOS transistor M2 is coupled to the ground terminal GND and the other end of the eighth resistor R8.

The third switch 23 comprises a third MOS transistor M3, a second capacitor C2, a ninth resistor R9, and a tenth resistor R10. A PMOS transistor is used as the third MOS transistor M3 for explanation in the preferred embodiment, but not limited to this. The third MOS transistor M3 has a gate, a source, and a drain. The source of the third MOS transistor M3 is coupled to the other end L2 of the motor. The drain of the third MOS transistor M3 is coupled to the drain of the first MOS transistor M1, one end of the second capacitor C2, and one end of the ninth resistor R9. The other end of the second capacitor C2 is coupled to the gate of the third MOS transistor M3 and the other end of the ninth resistor R9. Two ends of the tenth resistor R10 are individually coupled to the other end of the ninth resistor R9 and the emitter of the fourth transistor Q4. In other words, the other end of the tenth resistor R10 is electrically connected to the emitters of the fourth and fifth transistors Q4/Q5.

There is capacitance (or parasitic capacitance) existing between the gate and the source of the third MOS transistor M3. The periods of the charging (i.e., turning on the third MOS transistor M3) and discharging (i.e., turning off the third MOS transistor M3) caused by the capacitance will affect the switching speed of the third MOS transistor M3. Therefore, by means of the second push-pull amplifier 261 which provides an amplified current to charge the capacitor, the charge/discharge periods can be effectively reduced, which speeds up the switching speed of the third MOS transistor M3, achieves the effect of reducing the switching loss, and facilitates the resolution of the problem of insufficient derating of junction temperature (Tj).

Please continue to refer to FIGS. 3 and 4. The fourth switch comprises 24 a fourth MOS transistor M4, an eleventh resistor R11, and a twelfth resistor R12. An NMOS transistor is used as the fourth MOS transistor M4 for explanation in the preferred embodiment, but not limited to this. The fourth MOS transistor M4 has a gate, a source, and a drain. The drain of the fourth MOS transistor M4 is coupled to the other end L2 of the motor and the source of the third MOS transistor M3. The gate of the fourth MOS transistor M4 is coupled to one end of the eleventh resistor R11 and one end of the twelfth resistor R12. The source of the fourth MOS transistor M4 is coupled to the ground terminal GND. The other end of the twelfth resistor R12 is coupled to the ground terminal GND.

The control unit 28 has a first pin 281, a second pin 282, a third pin 283, a fourth pin 284, a fifth pin 285, a sixth pin 286, a seventh pin 287, and an eighth pin 288. The first pin 281, which is a HIGH-SIDE pin, is electrically connected to the emitter of the sixth transistor Q6 and the other end of the second resistor R2 to output the driving voltage. The second pin 282, which is a PWMA pin, is electrically connected to the other end of the eleventh resistor R11 to output the first signal. The third pin 283, which is a PWMB pin, is electrically connected to the other end of the seventh resistor R7 to output the second signal. The fourth pin 284, which is a VDD pin, is electrically connected to the other end of the fourth resistor R4 to output an operating voltage. The fifth pin 285, which is a HALL-IN pin, is electrically connected to a Hall device 29 to receive a sense signal (i.e., a Hall signal) transmitted by the Hall device 29. The sixth pin 286, which is a VSS pin, and one end of a fourth capacitor C4 are electrically connected to the ground terminal GND. The other end of the fourth capacitor C4 is electrically connected to the one end of a thirteenth resistor R13; the other end of the thirteenth resistor R13 is coupled to the first pin 281.

The control unit 28 are with eight pins for explanation in the preferred embodiment, but is not limited to this. In practice, the user can use a control unit 28 with more pins (or named as a control chip) depending on functional demands by design change. For example, a control chip with 10 pins, 12 pins or, above 12 pins.

Therefore, by means of the circuit design of the present invention, the charge/discharge periods of the first and third MOS transistors M1/M3 can be effectively reduced (or shortened) to speed up (enhance) the switching speeds of the first and third MOS transistors M1/M3, which further reduces the switching losses of the first and third switches 21/23 and solves the problem of insufficient derating of junction temperature (Tj). Moreover, by means of the motor driving circuit 2 of the present invention which is applied to the fan, the junction temperatures (Tjs) of the first and third MOS transistors M1/M3 can be significantly reduced, which facilitates the improvement of the fan efficiency.

In summary, compared with the prior art, the present invention has the following advantages:

1. achieve the effect of reducing the charge/discharge periods of the first and third switches 21/23.

2. speed up the switching speeds of the first and third MOS transistors M1/M3 to reduce the switching losses of the first and third MOS transistors M1/M3.

3. resolve the problem of insufficient derating of junction temperature (Tj).

4. facilitate the improvement of the fan efficiency.

The present invention has been described in detail above. It will be understood that the above description is only about some preferred embodiments of the present invention, which should not limit the scope of the present invention. All equivalent variations and modifications associated with the method, shape, structure, and device according to the claimed scope of the present invention should be embraced by the scope of the appended claims of the present invention.

What is claimed is:

1. A motor driving circuit to reduce switching loss, which is applied to a motor, comprising:

a motor driving unit having a first switch, a second switch, a third switch, and a fourth switch, wherein each of the first, second, third, and fourth switches has a first terminal, a second terminal, a third terminal, and a fourth terminal, wherein the second terminals of the first and third switches are individually coupled to the corresponding third terminals of the second and fourth switches, wherein the third terminal of the first switch is coupled to the third terminal of the third switch, wherein the second terminal of the second switch is coupled to the second terminal of the fourth switch, wherein the fourth terminals of the second and fourth switches are coupled to a ground terminal, wherein the first terminal of the third switch is coupled to an input voltage;

a push-pull output unit having a first push-pull amplifier and a second push-pull amplifier, wherein each of the first and second push-pull amplifiers has a first end, a second end, a third end, and a fourth end, wherein the second and third ends of the first push-pull amplifier are connected to the fourth and first terminals of the first switch, respectively, wherein the second and third ends of the second push-pull amplifier are connected to the fourth and first terminals of the third switch, respectively, wherein the fourth ends of the first and second push-pull amplifiers are connected to the ground terminal;

a control unit having a plurality of pins, wherein a first pin is coupled to the first ends of the first and second push-pull amplifiers and transmits a driving voltage to the first and second push-pull amplifiers such that the first and second push-pull amplifiers are driven to generate a first amplified current and a second amplified current, respectively, wherein the first and third switches individually receive the first and second amplifier currents, respectively, to reduce charge/discharge periods thereof;

wherein a second pin and a third pin of the control unit are coupled to the first terminals of the fourth and second switches, respectively, wherein the second and third pins of the control unit transmit a first signal and a second signal to the first terminals of the fourth and second switches, respectively; and wherein the first push-pull amplifier has a first transistor, a second transistor, a third transistor, a first resistor, and a second resistor, wherein each of the first, second, and third transistors has a base, an emitter, and a collector, wherein the collector of the first transistor is coupled to the first terminal of the first switch, one end of the first resistor, and the input voltage, wherein the emitter of the first transistor is coupled to the emitter of the second transistor and the fourth terminal of the first switch, wherein the collector of the second transistor is coupled to the ground terminal, wherein the base of the second transistor is coupled to the base of the first transistor, the other end of the first resistor, and the collector of the third transistor, wherein the emitter of the third transistor is coupled to the ground terminal, wherein the base of the third transistor is coupled to one end of the second resistor, wherein the other end of the second resistor is coupled to the first pin of the control unit.

2. The motor driving circuit to reduce switching loss according to claim 1, wherein the second push-pull amplifier has a fourth transistor, a fifth transistor, a sixth transistor, a third resistor, and a fourth resistor, wherein each of the fourth, fifth, and sixth transistors has a base, an emitter, and a collector, wherein the collector of the fourth transistor is coupled to the first terminal of the third switch and one end of the third resistor, wherein the emitter of the fourth transistor is coupled to the emitter of the fifth transistor and the fourth terminal of the third switch, wherein the collector of the fifth transistor is coupled to the end terminal, wherein the base of the fifth transistor is coupled to the base of the fourth transistor, the other end of the third resistor, and the collector of the sixth transistor, wherein the emitter of the sixth transistor is coupled to the first pin of the control unit, wherein the base of the sixth transistor is coupled to one end of the fourth resistor, wherein the other end of the fourth resistor is coupled to a fourth pin of the control unit.

3. The motor driving circuit to reduce switching loss according to claim 2, wherein the first switch comprises a first MOS transistor, a first capacitor, a fifth resistor, and a sixth resistor, wherein the first MOS transistor has a gate, a source, and a drain, wherein the source of the first MOS transistor is connected to one end of the motor, wherein two ends of the first capacitor are individually connected to the drain and the gate of the first MOS transistor, wherein one end of the fifth resistor is electrically connected to one end of the first capacitor, the input voltage, and the collector of the first transistor, wherein the other end of the fifth resistor is coupled to the other end of the first capacitor and one end of the sixth resistor, wherein the other end of the sixth resistor is coupled to the emitter of the first transistor.

4. The motor driving circuit to reduce switching loss according to claim 3, wherein the second switch comprises a second MOS transistor, a seventh resistor, and an eighth resistor, wherein the second MOS transistor has a gate, a source, and a drain, wherein the drain of the second MOS transistor is coupled to the one end of the motor and the source of the first MOS transistor, wherein the gate of the second MOS transistor is coupled to one end of the seventh resistor and one end of the eighth resistor, wherein the source of the second MOS transistor is coupled to the ground terminal and the other end of the eighth resistor, wherein the other end of the seventh resistor is coupled to the third pin of the control unit.

5. The motor driving circuit to reduce switching loss according to claim 4, wherein the third switch comprises a third MOS transistor, a second capacitor, a ninth resistor, and a tenth resistor, wherein the third MOS transistor has a gate, a source, and a drain, wherein the source of the third MOS transistor is coupled to the other end of the motor, wherein the drain of the third MOS transistor is coupled to the drain of the first MOS transistor, one end of the second capacitor, and one end of the ninth resistor, wherein the other end of the second capacitor is coupled to the gate of the third MOS transistor and the other end of the ninth resistor, wherein two ends of the tenth resistor are individually coupled to the other end of the ninth resistor and the emitter of the fourth transistor.

6. The motor driving circuit to reduce switching loss according to claim 5, wherein the fourth switch comprises a fourth MOS transistor, an eleventh resistor, and a twelfth resistor, wherein the fourth MOS transistor has a gate, a source, and a drain, wherein the drain of the fourth MOS transistor is coupled to the other end of the motor and the source of the third MOS transistor, wherein the gate of the fourth MOS transistor is coupled to one end of the eleventh resistor and one end of the twelfth resistor, wherein the source of the fourth MOS transistor is coupled to the ground terminal, wherein the other end of the eleventh resistor is coupled to the second pin of the control unit, wherein the other end of the twelfth resistor is coupled to the ground terminal.

7. The motor driving circuit to reduce switching loss according to claim 6, wherein the first and third MOS transistors are PMOS transistors, wherein the second and fourth MOS transistors are NMOS transistors.

8. The motor driving circuit to reduce switching loss according to claim 2, wherein the first, second, third, fourth, fifth, and sixth transistors are BJTs.

* * * * *